(12) United States Patent
Guitton

(10) Patent No.: US 8,668,800 B2
(45) Date of Patent: Mar. 11, 2014

(54) METHOD OF MANUFACTURING HOLLOW COMPOSITE PARTS WITH IN SITU FORMED INTERNAL STRUCTURES

(76) Inventor: Maurice Guitton, Lunenburg (CA)

(*) Notice: Subject to any disclaimer, the term of this patent is extended or adjusted under 35 U.S.C. 154(b) by 0 days.

(21) Appl. No.: 13/430,616

(22) Filed: Mar. 26, 2012

(65) Prior Publication Data

US 2013/0075025 A1    Mar. 28, 2013

Related U.S. Application Data

(60) Provisional application No. 61/467,871, filed on Mar. 25, 2011.

(51) Int. Cl.
*B28B 7/28* (2006.01)
(52) U.S. Cl.
USPC ........... 156/246; 156/173; 264/313; 264/316; 425/182; 425/436 R
(58) Field of Classification Search
USPC .......... 425/182, 185, 186, 441; 264/313, 316; 156/173, 156, 245, 469; 416/226, 233
See application file for complete search history.

(56) References Cited

U.S. PATENT DOCUMENTS

| | | | | |
|---|---|---|---|---|
| 1,335,105 A | * | 3/1920 | Frederick | 156/184 |
| 2,445,290 A | * | 7/1948 | Gonda | 428/188 |
| 3,560,316 A | * | 2/1971 | Gill | 428/174 |
| 4,136,150 A | * | 1/1979 | Darnall, Jr. | 264/318 |
| 4,388,263 A | * | 6/1983 | Prunty | 264/257 |
| 5,183,615 A | * | 2/1993 | Zushi | 264/219 |
| 5,547,629 A | * | 8/1996 | Diesen et al. | 264/257 |
| 7,887,734 B2 | * | 2/2011 | Sanderson | 264/313 |
| 2003/0116262 A1 | * | 6/2003 | Stiesdal et al. | 156/245 |
| 2009/0250847 A1 | * | 10/2009 | Burchardt et al. | 264/511 |
| 2009/0309268 A1 | * | 12/2009 | Cavaliere et al. | 264/511 |
| 2010/0062238 A1 | * | 3/2010 | Doyle et al. | 428/295.1 |
| 2010/0075074 A1 | * | 3/2010 | Wilson et al. | 428/34.1 |
| 2012/0107129 A1 | * | 5/2012 | Kulenkampff et al. | 416/226 |

\* cited by examiner

*Primary Examiner* — William Bell
(74) *Attorney, Agent, or Firm* — Dean A. Craine

(57) ABSTRACT

A method for manufacturing complex hollow composite parts with at least one internal structure formed in situ by laying laminated layers around a removable mandrel assembled inside the part's inner cavity. The inner mandrel is made up of two jig plate assemblies aligned in a parallel manner and space apart where the internal structure is to manufactured. Each jig plate assembly is made up of at least three jig plates stacked in an edge-to-edge manner Located on opposite sides of each jig plate assembly is an elastic envelope filled with spherical objects. When evacuated, the envelope collapses and relaxes and composite material may then laid up inside the inner cavity and around the envelopes. When exposed to a heat, the envelopes expand and in situ and form internal structures inside surface of the cavity. Each envelope and each jig plate assemblies can be easily dissembled and reused.

2 Claims, 4 Drawing Sheets

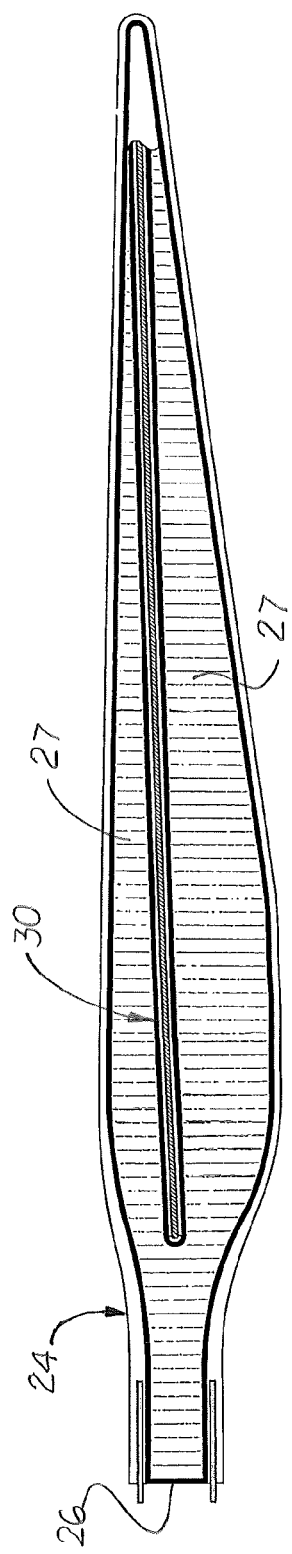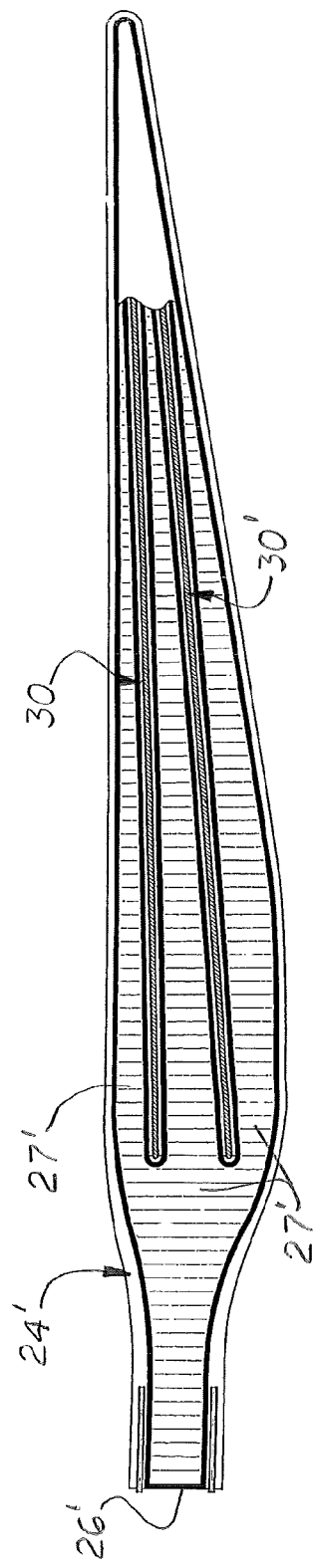

METHOD OF MANUFACTURING HOLLOW COMPOSITE PARTS WITH IN SITU FORMED INTERNAL STRUCTURES

This utility patent application is based on and claims the priority filing date of U.S. Provisional patent application 61/467,871 filed on Mar. 25, 2011.

BACKGROUND OF THE INVENTION

1. Field of the Invention

The disclosed embodiments relate to the field of manufacturing complex structures made of composites that are formed in molds using compacting molding processes, and more particularly, to such structures that are hollow and include internal structures.

2. Description of the Related Art

The inventor is a co-inventor of a method of producing structures of complex shapes of composite materials disclosed in U.S. patent application Ser. No. 12/296,689, filed on Jun. 3, 2009. The method discloses the use of a flexible, elastomeric envelope, also called a bladder, filled with small spherical objects of different diameters that after undergoing evacuation of air, form a rigid mandrel for laying up dry fiber, prepreg, or film resin to create composite laminated layers on the inner cavity of a composite part. During setup, the bladder is made into a rigid mandrel by filling it with spherical objects and then evacuating the air inside the bladder to compact the spherical objects. The bladder is then sealed to maintain a vacuum which forms a compact, temporary rigid mandrel upon which composite layers can be laid. When the mold is heated, the bladder located inside the part is filled with compressed air causing it to expand and evenly apply a uniform, compaction force to the inside surfaces of the part's interior cavity. Different envelopes may be used that undergo different amounts of expansion when heated to produce different shape bladders that form different wall thicknesses After compaction, the part is then allowed to cure under regulated air or nitrogen pressure. After curing, air is allowed to enter the envelope causing the envelope t relax and return to its original, flexible state. The envelope is then removed from the part.

Many industries use hollow, complex-shaped, lightweight parts made of composite material that must be precisely manufactured to pre-determined specifications. Not only must the outer surfaces of parts be manufactured to the desired specifications, but the inside and interior walls of the part must be precisely shaped and formed so that exterior and interior walls in the part have the desired thicknesses. It is important that sufficient compaction be used to eliminate porosity in the composite layers. An example of a hollow, complex-shaped, lightweight part made of composite material is a windmill blade.

U.S. Pat. No. 7,473,385 discloses a method of manufacturing hollow windmill blades that includes the use of molds that compact the laminated layers and the use of infused resin. The blade includes a continuous thin outer layer that forms an upper and lower blade sections that surround a hollow cavity. Located inside the hollow cavity is a supporting shear web that extends between the upper and lower sections of the blade. The upper and lower sections of the blade has a layered, sandwich construction comprising an upper fiber layer and a lower fiber layer surrounding an inner passageway that is filled with infused resin, film infusion or pre-preg material.

The shear spar is formed by placing two removable jig plates on opposite sides of the shear spar and the inside the inner cavity. The two jig plates are located in the spaces located on opposite sides of the shear web to be constructed therein to create a compaction force when the envelope or the bladder is pressurized. The outer surfaces of the two jig plates are covered by fiber layers that when placed inside the inner cavity, forms a shear cavity. Located inside the shear cavity may be a piece of core spacer During manufacturing, liquid resin may be infused into the shear cavity, which after curing forms the shear web. In some applications, pre-preg material or film infusion may be used in place of the liquid resin. Surrounding the fiber layers on the upper and lower sections is a flexible membrane that surrounds the inner passageway that surrounds the upper and lower sections to compact the fiber layers and to force the liquid resin, into the inner passageway and the shear cavity.

One drawback with the method disclosed in U.S. Pat. No. 7,473,385 is that liquid resin is not infused completely or uniformly into the inner cavity or the shear cavity. As a result, defects in the part may occur that make the part unusable. Another drawback with this method is that it requires the use two different manufacturing processes—heat/vacuum compaction process and vacuum resin infusion process. The use of these two processes make setup and teardown time longer and more difficult.

What is needed is an improved method for method of manufacturing hollow composite parts formed by compaction with in situ formed internal structures thereby creating parts that are manufactured to design specifications with have fewer defects.

SUMMARY OF THE INVENTION

At the heart of this invention is the discovery that complex, structural composite structures made by resin, pre-preg or film infusion processes, often contain defects and other imperfections in the laminate layers that result in the part being rejected or needing repair before being used.

Also at the heart of the invention is that composite parts made entirely of heat circulation with air compaction processes produce laminated layers that after curing are uniform and meet design specifications.

Disclosed herein is a method of manufacturing complex, composite structures, such as a wind turbine blade or mast, that have a hollow inner cavity geometry not achievable with conventional technologies know today. The method enables structures to be manufactured that can integrate, one, two, three or more spars (I beam, H Beam, O channel, or other geometry). The entire structure is manufactured in-situ and is monolithic, sandwich type or both.

The geometry of the core is shaped with a formable and deformable, elastomeric envelope, made of rubber, silicone, Fluor-silicon, or RTV material. The shape of the envelope can conform to any desired core geometry. The envelope can be used with any single or multiple spars or (I beam, H beam, O Channel and other geometry) in the desired location requested by the structural design of the part. During use, the envelop is heat expanded and filled with compressed air to apply different amounts of compression force according to the fibre used during layup to achieve the right compaction of the laminate.

The elastomeric bladder, hereinafter called an envelope, is taught in U.S. patent application Ser. No. 12/296,689, filed on Jun. 3, 2009, and now incorporated by reference. The envelope, the shape of which is produced the desired shape of the interior cavity formed in the part, is placed in a mold. The envelope is first filled with solid spherical objects. After filling the envelope with the spherical objects, the air or nitrogen inside the envelope is evacuated that has the effect of compacting and lumping the spherical objects together. The spherical objects contained inside the envelope gives the envelope its desired shape and rigidity to act as a support for the positioning of fabrics pre-impregnated with resin placed there over. The composite layers are then laid up around the inside surface of the mold cavity and over the envelope. When the mold is close, a vacuum is created in the mold cavity that causes the envelope to also expand. After heating and curing the resin, pre-preg, or the film infusion for desired time, a vacuum relative to the outside air is created. To removed the envelope from the mold and to remove the spherical objects from the envelope, the envelope must be opened. The envelope and spherical objects can then be removed.

In the drawings, the part is a wind turbine blade or mast with at least one internal support structure, hereinafter known as a shear spar. The shear spar is formed by laying up composite laminated layers around a removable mandrel temporarily assembled inside the mold cavity and at the desired location. The removable mandrel includes two parallel jig plate assemblies spaced apart inside the part's internal cavity. In the embodiment described herein, the part is made of laminate material can be made by resin infusion, pre-preg, film infusion or with thermoplastic material with long fibers reinforcement. Composite laminate material is laid up over the inner cavity and inbetween the two jig plates forming an I-shaped uncured laminated structure. A thin twisted UD tow of fiber or a thin breaded rope fiber ribbon of composite material, called a noodle or filler, may be placed in the shear web to eliminate voids that can be created that lead to internal delimitation on the top and bottom of the laminated structure.

Each jig plate assembly is made up of at least three conical jig plates stacked in an edge-to-edge manner inside the part's inner cavity. The middle plate includes upper and lower straight edges that converge towards the opposite closed end of the part. During assembly and disassembly, the middle jig plate slides freely inward or outward between the upper and lower jig plates thereby enabling the jib plate assembly to selectively expand or collapse, respectively.

A key component of the invention is the envelope discussed above used with the two jib plate assemblies. Once layup is completed, the top section of the mold is then closed over the lower section of the mold. The inner cavity is then evacuated and the cure cycle is started generating heat according the resin system cycle of the material supplier. As stated above, the air inside the envelope may be progressively replaced by air or nitrogen gas thereby gradually inflating the envelope and uniformly compacting the laminate layers. This process is monitored. The air or the nitrogen gas causes the envelope to expand evenly and uniformly to compress the laminate layers in all directions. After the composite laminated layers have cured, the part is removed from the mold and the elastomeric envelope is opened thereby enabling it to compress and shirk so that it may be removed from the part's inner cavity. The middle plate on each jig plate is able to can slide longitudinally in between the upper and lower jig plates enabling the entire mandrel to be easily removed from the part.

When completed, a hollow, laminated composite part is produced with at least one in situ formed internal shear spar that is made by compression.

DESCRIPTION OF THE DRAWINGS

FIGS. 3 and 4 show horizontal cross sectional plan views of the wind turbine blades shown in FIGS. 1 and 2, respectively, with the jig plate assemblies and the envelope removed so that the shear spars that extend the entire length of the part may be more clearly seen.

FIG. 6 is a cross section of the jig plate showing the conical shape of the middle jig plate with diagonal side walls that enable the middle jig plate to be pulled outward and disengaged from the adjacent upper and lower jig plates thereby enabling the entire jig plate assembly to be easily disassembled.

DESCRIPTION OF THE PREFERRED EMBODIMENT(S)

Figure 1:
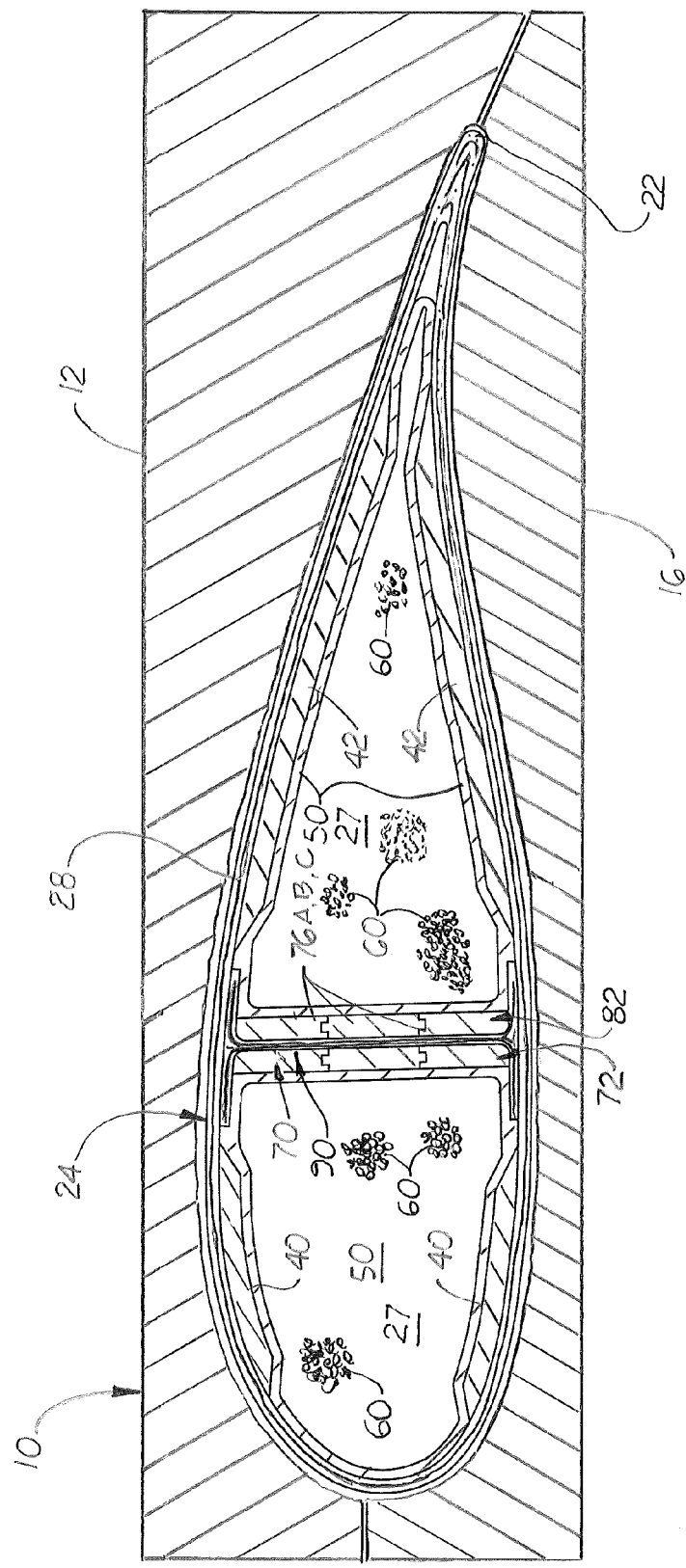
FIG. 1 is a cross sectional, side elevation view of a wind turbine blade part with an inner cavity formed therein and with a single shear spars formed inside the cavity between two envelopes that press against one set of removable jig plates located inside the inner cavity.

Disclosed here in a method for manufacturing a complex shape in situ, hollow core composite blade or boat mast part 24 with at least one internal structure, called a shear spar 30 formed in situ the part's inner cavity 27 and simultaneously with the part's outer side walls 28. As shown in FIGS. 3 and 4, the part 24, 24' is shown for illustration to be a wind turbine blade. It should be understood that the method disclosed may be used to manufacture other complex, hollow structures, such as a mast, a pole, and an aircraft wing or stabilizer made of composite material.

The method disclosed uses the elastomeric bladder, called an envelope 50 that is taught in U.S. patent application Ser. No. 12/296,689, filed on Jun. 3, 2009, and now incorporated by reference herein. The envelope 50 is made from an elastomeric material and filled with a plurality of non-inactivity, free flowing spherical objects 60 of different or identical diameters. The envelope 50, the shape of which is preferably produced following the desired shape of the inner cavity 27, 27' formed in the part 24, 24', respectively. During use, the envelope 50 is placed into the mold cavity 22 and presses against the laminate material 40, 42 laid up along the inside surface of the mold cavity 22. When a vacuum is created inside the mold 10, the walls of the envelope 50 expand and exert a compress force against the inside surfaces of the laminate material 40, 42.

As mentioned above, the plurality of spherical objects 60 placed inside the envelope 50 applied a uniform force against the laminate layers 40, 42. During assembly, the envelope 50 is then partially evacuated and sealed. When a vacuum is then created inside the mold cavity 22, the envelope 50 uniformly expands and evenly presses the laminate material 40, 42 against the inside surface of the mold cavity 22.

In the FIGS. 3 and 4, the part 24, 24' is a wind turbine blade or mast with one internal shear spar 30 or two shear spars 30, 30' respectively. Each shear spar 30 or 30' is formed by laying up a composite laminated layer 90 inside a removable mandrel 70 temporarily assembled inside the mold cavity 22. The removable mandrel 70 includes two parallel jig plate assemblies 72, 82 spaced apart inside the mold cavity 22. Composite laminate material 90 is laid up inside the gap formed between the two jig plates assemblies 72, 82 by forming an laminated, shear spar with an I-shaped configuration. As shown in FIG. 4, a thin twisted UD tow of fiber or a thin breaded rope fiber ribbon of composite material 100, also called a noodle or filler, may be placed in the ends of the shear spars to eliminate voids that may be created that lead to internal delimitation on the top and bottom of the laminated structure.

FIG. 1 shows a two part shell-style mold 10 made up of a top mold section 12 placed over a lower mold section 16. Formed on each section 12, 16 is a partial mold cavity that when closed form an enclosed, sealed mold cavity 22. Formed on end of the mold cavity is at least one closable air inlet/outlet port.

Figure 2:
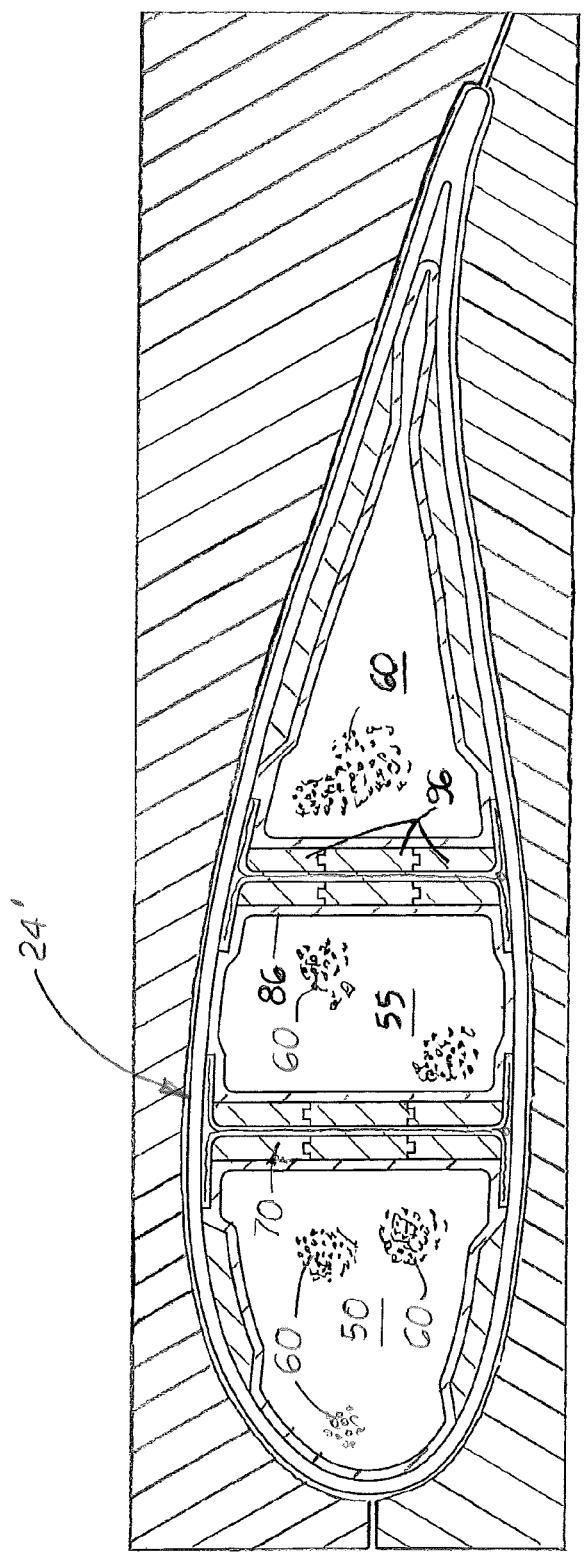
FIG. 2 is a cross sectional, side elevation view of a wind turbine blade part similar to the wind turbine blade shown in FIG. 1, with two shear spars being inside the inner cavity with three envelopes and two sets of set of jig plates.
Figure 5:
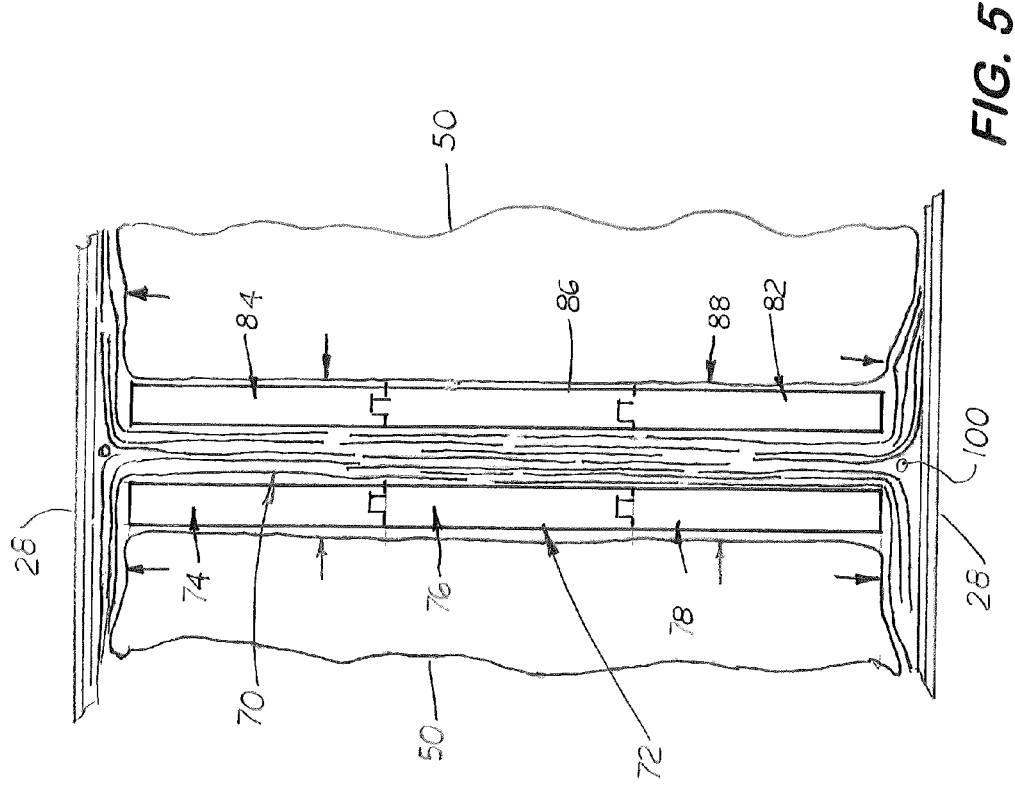
FIG. 5 is a cross sectional, elevation view of a section of the wind turbine blade showing one replaceable mandrel made up of two jig plate assemblies spaced apart with fiber layup placed the gap formed between the two jig plate assemblies.

FIG. 2 is a cross sectional, side elevation view of a wind turbine blade part 24' similar to the wind turbine blade part 24 shown in FIG. 1, with two shear spars 30, 30' being formed inside mold cavity 22 with at least one envelope 50 and a replaceable mandrel 70. Each mandrel 70 includes two jig plate assembles 72, 82. As shown in FIG. 5, each jig plate assembly 72, 82 is made up of least three plates, 74, 76, 78 and 84, 86, 88 respectively. The three plates 74, 76, 88 and 84, 86, 88 are stacked in an edge-to-edge manner inside the mold cavity 22. The adjacent edges on the adjoining plates include a sliding 'dove tail' profile that enable them to slide together. The edges of the middle plates 76, 86 and the two inside edges on the upper and lower plates 74, 78 and 84, 88, respectively, are straight and diagonally aligned so that the middle plates 76, 86 may slide freely thereby enabling the jig plate assembly 72,82 to selectively expand or collapse the jig assembly inner mandrel. Also, formed on each part 24, 24'is a suitable size opening 26, 26', respectively, designed to allow the three jig plates 74, 76, 78 and 84, 86, 88 to be individually removed from the part 24 after curing.

To manufacture both parts, 24, 24' a mold 12 with two mold sections 12, 16 is first selected with a suitable mold cavity 22 formed between them to manufacture the desired hollow part 24, 24'. Each shear spar 30,30' is formed by laying up composite laminated layers around two removable jig plates assemblies72, 82 temporarily assembled inside the mold cavity 22 and at the desired location. In the embodiment described herein, the laminate material is resin infusion pre-preg, or film infusion. Composite laminate material is laid up over top, bottom and one wide surface of each inner section of the jig plate assembly thereby forming an I-shape, H shape, L shape ,O shape, Z shape, X shape Y shape uncured laminated structure when both inner mandrels are placed inside the part's inner cavity. Wet material can lay up in the same way as 'pre-preg, dry fiber, film infusion, thermoplastic like "TWIN-TEX" ®(a trademark owned by OCV Intellectual Capital, LLC, located in Toledo, Ohio), commingle material and hybrid fibers, kevelar, carbon, balsa, etc.

FIG. 5 is a cross section , elevation showing the fiber layup between the jigs plate assemblies 72, 82, sandwich between the two separate envelopes or between two sections of a single envelope, the laminate composite material laid up over their inside surfaces and around their ends.

FIG. 6 is a cross section, elevation of the jig plate assemblies showing three three elongated jig plates stacked end to end and showing the middle jig plate being removed so that jig plate assembly may collapse and be removed from the cured part.

Because the mold, the replaceable mandrel and the envelope 50 are reusable, multiple parts with exact specifications may be manufactured quickly and easily. In the embodiment described herein, the part is made of laminate material can be made by resin infusion, pre-preg, film infusion or with thermoplastic material with long fibers reinforcement.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A method for manufacturing a complex hollow composite part with at least one internal structure comprising the following steps:
   a. selecting a mold with a part cavity suitable for laying up composite laminated layers;
   b. selecting at least two inner mandrels to be placed inside said part cavity and used to form an internal structure made of composite laminated material, each said inner mandrel being made of at least three jig plates aligned edge to edge and slidingly engaged, at least one said jig plate being tapered enabling said inner mandrel to collapse when at least one said jig plate is slidingly removed from said part;
   c. applying layers of dry fiber, wet fiber, pre-preg, film infusion, or laminated material around each said inner mandrel;
   d. inserting said inner mandrels covered with dry fiber, wet fiber, pre-preg, film infusion, or laminated material into said mold cavity;
   e. selecting two elastomeric envelopes each filled with spherical material, each said envelope configured to become rigid when evacuated and expand when heated;
   f. positioning said envelopes inside said mold cavity and on opposite sides of said inner mandrels;
   g. laying up said layers of dry fiber, wet fiber, pre-preg, film infusion, or laminated material around said envelopes and said inner mandrels;
   h. closing said mold;
   i. heating and curing said part inside said mold; and,
   j. removing said envelopes and said inner mandrels from said part.

2. A reusable mold used to make composite parts with an insitu formed internal structure, comprising:
   a. a two part mold each with a mold cavity that when joined together to form a mold cavity for a composite part;
   a at least one reuseable mandrel, each said resuseable mandrel made up of two jig plate assemblies configured to be aligned in a space apart, parallel manner inside said mold cavity, each said jig plate assembly made up of a plurality of sliding jig plates connected together in an edge to edge manner; and,
   c. at least one elastic envelope placed inside said mold cavity, said envelope configured to expand when a vacuum is created inside said mold cavity and compress laminate material placed along the inside surface of said mold cavity and exert a force on said said jig plate assemblies and compress composite material located between said jig plate assemblies.

* * * * *